(12) United States Patent
Yu

(10) Patent No.: US 12,297,980 B2
(45) Date of Patent: May 13, 2025

(54) DISPLAY DEVICES

(71) Applicant: WUHAN CHINA STAR OPTOELECTRONICS TECHNOLOGY CO., LTD., Hubei (CN)

(72) Inventor: Shuliang Yu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 18/253,591

(22) PCT Filed: Mar. 30, 2023

(86) PCT No.: PCT/CN2023/085235
§ 371 (c)(1),
(2) Date: May 18, 2023

(87) PCT Pub. No.: WO2024/192806
PCT Pub. Date: Sep. 26, 2024

(65) Prior Publication Data
US 2024/0377046 A1 Nov. 14, 2024

(30) Foreign Application Priority Data
Mar. 22, 2023 (CN) .......................... 202310296917.X

(51) Int. Cl.
*F21V 15/01* (2006.01)
(52) U.S. Cl.
CPC ................................... *F21V 15/01* (2013.01)
(58) Field of Classification Search
CPC ............. F21V 15/01; G02F 1/133308; G02F 1/133314; G02F 1/133325; G02F 1/13332
See application file for complete search history.

(56) References Cited

U.S. PATENT DOCUMENTS 6,950,154 B2 * 9/2005 Lee .................. G02F 1/133308
349/65
7,517,134 B2 * 4/2009 Hu .................... G02F 1/133606
362/362
(Continued)

FOREIGN PATENT DOCUMENTS

CN 102003653 A 4/2011
CN 102175001 A 9/2011
(Continued)

OTHER PUBLICATIONS

International Search Report in International application No. PCT/CN2023/085235, mailed on Dec. 7, 2023.
(Continued)

*Primary Examiner* — Tsion Tumebo
(74) *Attorney, Agent, or Firm* — PV IP PC; Wei Te Chung

(57) ABSTRACT

A display device that includes a back frame and an optical diaphragm group. The back frame includes a bottom plate and a plurality of connection plates connected to a same side of the bottom plate to define an accommodation groove in the back frame, a side of the connection plates close to the accommodation groove is provided with a sliding slot, and a notch of the sliding slot is provided facing the accommodation groove. The optical diaphragm group is disposed in the accommodation groove and clamped into the sliding slot. The back frame further includes at least one fixation member disposed on the connection plates, and the optical diaphragm group further includes at least one connection member matching and connected to the at least one fixation member.

20 Claims, 6 Drawing Sheets

(56) References Cited

U.S. PATENT DOCUMENTS

| | | | |
|---|---|---|---|
| 9,395,484 B2* | 7/2016 | Lee | G02B 6/0088 |
| 9,726,912 B2* | 8/2017 | Gai | G02F 1/0102 |
| 9,964,786 B2* | 5/2018 | Ma | G02B 6/009 |
| 2008/0094535 A1* | 4/2008 | Suh | G02B 6/0088 362/633 |
| 2008/0170171 A1* | 7/2008 | Jing | G02F 1/133308 349/58 |
| 2014/0362325 A1* | 12/2014 | Lee | G02F 1/133308 445/24 |
| 2016/0195758 A1 | 7/2016 | Lin | |

FOREIGN PATENT DOCUMENTS

| | | |
|---|---|---|
| CN | 203759385 U | 8/2014 |
| CN | 105423240 A | 3/2016 |
| CN | 109839774 A | 6/2019 |
| CN | 210005833 U | 1/2020 |
| CN | 111766742 A | 10/2020 |
| CN | 112114396 A | 12/2020 |
| CN | 112305812 A | 2/2021 |
| CN | 114360366 A | 4/2022 |
| CN | 114859594 A | 8/2022 |
| CN | 114967227 A | 8/2022 |
| CN | 217506322 U | 9/2022 |
| CN | 115793320 A | 3/2023 |
| CN | 218630448 U | 3/2023 |
| WO | 2020042393 A1 | 3/2020 |

OTHER PUBLICATIONS

Written Opinion of the International Search Authority in International application No. PCT/CN2023/085235, mailed on Dec. 7, 2023.

Chinese Office Action issued in corresponding Chinese Patent Application No. 202310296917.X dated Jan. 18, 2025, pp. 1-10.

* cited by examiner

DISPLAY DEVICES

TECHNICAL FIELD

The disclosure relates to the technical field of display, in particular to display devices.

BACKGROUND

A back frame and a middle frame are generally matched to fix optical diaphragms and a backlight source of backlight modules in currently display devices. The back frames can play a role in fixing and supporting the optical diaphragms and the backlight sources, and the middle frames can play a role in preventing the optical diaphragms from detaching and supporting display screens of the display devices.

However, due to high cost of the middle frames and a fact that the middle frames are prone to deformation during assembly processes, flatness of the middle frames is poor, resulting in an uneven display if the display screens are assembled on the middle frames. In addition, the middle frames are prone to friction with the back frames and the optical diaphragms, resulting in decline of a yield.

SUMMARY

Technical Problems

Embodiments of the disclosure provides a display device to reduce cost and improve a yield of the display device.

Technical Solutions

An embodiment of the disclosure provides a display device, and the display device includes a backlight module and a display module located on a light-emitting side of the backlight module;
the backlight module includes:
a back frame, including a bottom plate and a plurality of connection plates connected to a same side of the bottom plate, wherein the plurality of connection plates surround periphery of the bottom plate to define an accommodation groove in the back frame, a side of at least partial ones of the connection plates close to the accommodation groove is provided with a sliding slot, and a notch of the sliding slot is provided facing the accommodation groove; and
an optical diaphragm group, disposed in the accommodation groove and clamped into the sliding slot;
wherein the display module is disposed on the back frame and located on a side of the optical diaphragm group away from the bottom plate, the back frame further includes at least one fixation member disposed on the connection plates, and the optical diaphragm group further includes at least one connection member matching and connected to the at least one fixation member.

In an embodiment of the disclosure, the plurality of connection plates include a first connection plate, and the sliding slot includes a first sliding slot provided on a side of the first connection plate close to the accommodation groove; and
wherein the fixation member includes a protrusion part disposed in the first sliding slot, the connection member is provided with an opening corresponding to the protrusion part, and the protrusion part is inserted into the opening.

In an embodiment of the disclosure, the fixation member incudes a plurality of protrusion parts that are distributed in the first sliding slot along an extension direction of the first sliding slot and symmetrically disposed relative to a center of the first sliding slot; the connection member is provided with a plurality of openings, a number of the openings and a number of the protrusion parts are same, and the plurality of protrusion parts are correspondingly connected to the plurality of openings one-to-one.

In an embodiment of the disclosure, a side of the protrusion part facing the accommodation groove is provided with an inclined surface, and a width of a side of the protrusion part away from the bottom plate is less than a width of a side of the protrusion part close to the bottom plate.

In an embodiment of the disclosure, the fixation member further includes a limiting part disposed in the first sliding slot, the connection member is further provided with an avoidance groove corresponding to the limiting part, and the limiting part is abutted against the optical diaphragm group in the avoidance groove.

In an embodiment of the disclosure, the first connection plate is provided with an assembly hole corresponding to the limiting part, and the assembly hole is communicated with the first sliding slot to expose the limiting part.

In an embodiment of the disclosure, a surface of a side of the limiting part close to the assembly hole does not protrude outside the assembly hole.

In an embodiment of the disclosure, the backlight module further includes a first buffer member, and the first buffer member is disposed on a side of the optical diaphragm group away from the bottom plate and close to the avoidance groove, and disposed between the optical diaphragm group and an inner wall of the first sliding slot.

In an embodiment of the disclosure, the plurality of connection plates further includes two second connection plates connected to opposite two ends of the first connection plate, respectively, and the sliding slot further includes a second sliding slot provided on each of the second connection plates and communicated with the first sliding slot.

In an embodiment of the disclosure, the plurality of connection plates further includes a third connection plate disposed opposite to the first connection plate, the two second connection plates are further connected to opposite two ends of the third connection plate, respectively, and the first connection plate, the two second connection plates, and the third connection plate are connected to define the accommodation groove.

In an embodiment of the disclosure, the fixation member is further provided with a fixation groove defined on the third connection plate, the connection member further includes an outer convex structure corresponding to the fixation groove, and the outer convex structure is inserted into the fixation groove.

In an embodiment of the disclosure, a side of each of the second connection plates away from the bottom plate is provided with an assembly opening communicating with the second sliding slot, and the assembly opening is defined on an end of the second connection plates away from the first connection plate, and located on a side of the second connection plates close to the accommodation groove; and
wherein the display module includes a second buffer member and a display panel, the second buffer member is disposed on a surface of a side of the first connection plate away from the bottom plate, a surface of a side of the second connection plates away from the bottom plate, and a surface of a side of the third connection plate away from the bottom plate, and the display panel is disposed on a surface of a side of the second buffer member away from the back frame.

In an embodiment of the disclosure, the second buffer member further extends onto a side of the assembly opening away from the bottom plate.

In an embodiment of the disclosure, a boundary of a side of the assembly opening away from the accommodation groove does not overlap the optical diaphragm group in a thickness direction of the optical diaphragm group.

An embodiment of the disclosure further provides a display device, and the display device includes a backlight module and a display module located on a light-emitting side of the backlight module;

the backlight module includes:
a back frame, including a bottom plate and a plurality of connection plates connected to a same side of the bottom plate, wherein the plurality of connection plates surround periphery of the bottom plate to define an accommodation groove in the back frame, a side of at least partial ones of the connection plates close to the accommodation groove is provided with a sliding slot, and a notch of the sliding slot is provided facing the accommodation groove; and
an optical diaphragm group, disposed in the accommodation groove and clamped into the sliding slot;
wherein the display module is disposed on the back frame and located on a side of the optical diaphragm group away from the bottom plate, the back frame further includes at least one fixation member disposed on the connection plates, and the optical diaphragm group further includes at least one connection member matching and connected to the at least one fixation member; and
wherein the plurality of connection plates include a first connection plate, and the sliding slot includes a first sliding slot provided on a side of the first connection plate close to the accommodation groove; wherein the fixation member includes a protrusion part disposed in the first sliding slot, the connection member is provided with an opening corresponding to the protrusion part, and the protrusion part is inserted into the opening.

In an embodiment of the disclosure, the fixation member includes a plurality of protrusion parts that are distributed in the first sliding slot along an extension direction of the first sliding slot and symmetrically disposed relative to a center of the first sliding slot; the connection member is provided with a plurality of openings, a number of the openings and a number of the protrusion parts are same, and the plurality of protrusion parts are correspondingly connected to the plurality of openings one-to-one.

In an embodiment of the disclosure, the fixation member further includes a limiting part disposed in the first sliding slot, the connection member is further provided with an avoidance groove corresponding to the limiting part, and the limiting part is abutted against the optical diaphragm group in the avoidance groove.

In an embodiment of the disclosure, the plurality of connection plates further includes two second connection plates connected to opposite two ends of the first connection plate, respectively, and the sliding slot further includes a second sliding slot provided on each of the second connection plates and communicated with the first sliding slot.

In an embodiment of the disclosure, the plurality of connection plates further includes a third connection plate disposed opposite to the first connection plate, the two second connection plates are further connected to opposite two ends of the third connection plate, respectively, and the first connection plate, the two second connection plates, and the third connection plate are connected to define the accommodation groove.

In an embodiment of the disclosure, a side of each of the second connection plates away from the bottom plate is provided with an assembly opening communicating with the second sliding slot, and the assembly opening is defined on an end of the second connection plates away from the first connection plate, and located on a side of the second connection plates close to the accommodation groove; and
wherein the display module includes a second buffer member and a display panel, the second buffer member is disposed on a surface of a side of the first connection plate away from the bottom plate, a surface of a side of the second connection plates away from the bottom plate, and a surface of a side of the third connection plate away from the bottom plate, and the display panel is disposed on a surface of a side of the second buffer member away from the back frame.

Beneficial Effects

Compared with the prior art, by designing the sliding slot on a side surface of the connection plate of the back frame, the optical diaphragm group provided by the disclosure can be clamped into the sliding slot. Specifically, by designing the fixation member in the sliding slot and the connection member in the optical diaphragm group, the optical diaphragm group can be fixed in the sliding slot through a matching connection between the fixation member and the connection member, so as to play a role in supporting and fixing the optical diaphragm group. In addition, the display module provided by the disclosure can be directly disposed on the back frame without designing a middle frame, avoiding an undesirable phenomenon caused by friction between the middle frame and the back frame, and the optical diaphragm group, thereby improving the yield of the display device.

BRIEF DESCRIPTION OF THE DRAWINGS

Technical solutions and other beneficial effects of the disclosure will be apparent through detailed description of specific implementation of the disclosure in combination with attached drawings.

DETAILED DESCRIPTION

In combination with drawings in the embodiments of the disclosure, technical solutions in the embodiments of the disclosure will be described clearly and completely. Obviously, the described embodiments are only part of the embodiments of the disclosure, not all of them. Based on the embodiments of the disclosure, all other embodiments obtained by those skilled in the art without creative effort belong to a scope of the disclosure.

The following disclosure provides many different embodiments or examples to realize different structures of the disclosure. In order to simplify the disclosure, components and arrangement of specific examples are described below. Of course, they are only examples and are not intended to limit the disclosure. In addition, the disclosure can repeat reference numbers and/or reference letters in different examples. This repetition is for a purpose of simplification and clarity, and does not indicate relationships between various embodiments and/or arrangement discussed. In addition, the disclosure provides examples of various specific processes and materials, but person having ordinary skill in the art can be aware of the disclosure of other processes and/or use of other materials.

Figure 1:
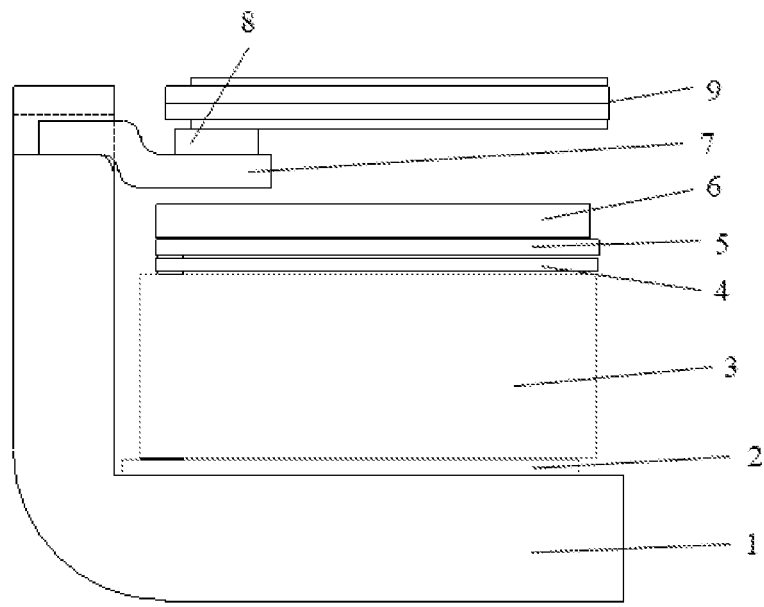
FIG. 1 is a schematic structural diagram of a display device in related art.

Referring to FIG. 1, a display device provided by the related art includes a backlight module and a display module located on a light-emitting side of the backlight module. Specifically, the backlight module includes a back frame 1, a reflecting sheet 2 disposed in the back frame 1, a light guide plate 3 disposed on the reflecting sheet 2, and an optical diaphragm 4, an optical diaphragm 5, and an optical diaphragm 6 disposed on the light guide plate 3. The reflecting sheet 2, the light guide plate 3, the optical diaphragm 4, the optical diaphragm 5, and the optical diaphragm 6 are all disposed in the back frame 1, and adhesive layers can be configured to be attached between the above-mentioned film layers. The display device further includes a middle frame 7, the middle frame 7 is fixedly connected to the back frame 1 and located on a side of the optical diaphragm 4, the optical diaphragm 5, and the optical diaphragm 6 away from the back frame 1. The display module is disposed on a side of the middle frame 7 away from the optical diaphragm 4, the optical diaphragm 5, and the optical diaphragm 6, and placed on the middle frame 7. Specifically, the display module includes a foam 8 disposed on the middle frame 7 and a display panel 9 disposed on a side of the foam 8 away from the middle frame 7. The middle frame 7 can be configured to support the display panel 9 and limit the optical diaphragm 4, the optical diaphragm 5, and the optical diaphragm 6 downward to avoid movement or detaching of the optical diaphragm 4, the optical diaphragm 5, and the optical diaphragm 6. However, due to high cost of the middle frame 7 and a fact that the middle frame 7 is prone to deformation during an assembly process, flatness of the middle frame 7 is poor, resulting in an uneven display if the display panel 9 is assembled on the middle frame 7. In addition, the middle frame 7 is prone to friction with the back frame 1, the optical diaphragm 4, the optical diaphragm 5, and the optical diaphragm 6, resulting in decline of a yield.

Figure 2:
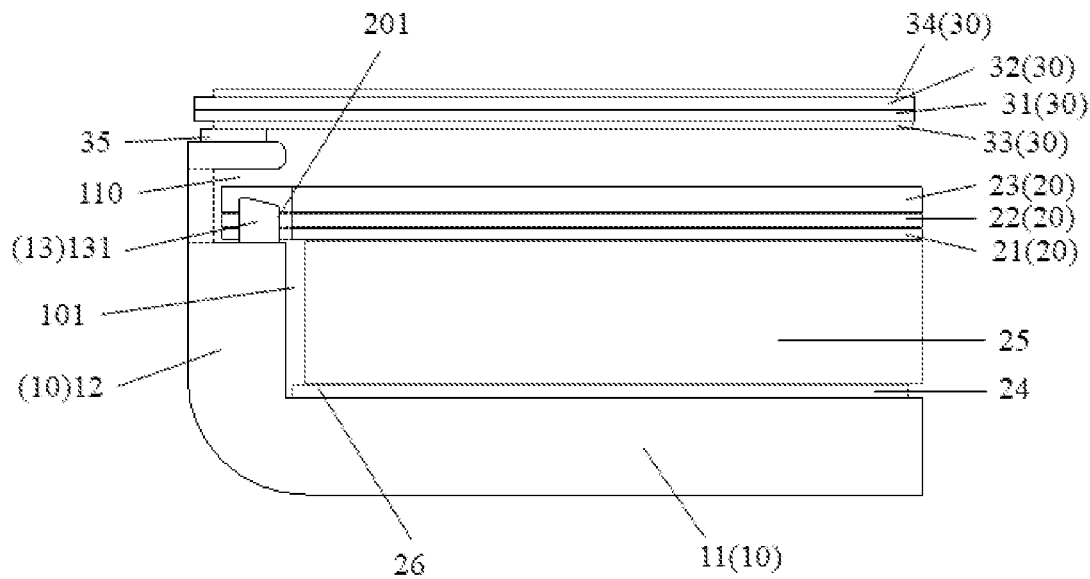
FIG. 2 is a schematic structural diagram of a display device provided by an embodiment of the disclosure.

Referring to FIG. 2, an embodiment of the disclosure provides a display device, and the display device includes a backlight module and a display module located on a light-emitting side of the backlight module.

Further, the backlight module includes a back frame 10 and an optical diaphragm group 20. The back frame 10 includes a bottom plate 11 and a plurality of connection plates 12 connected to a same side of the bottom plate 11. The plurality of connection plates 12 surround periphery of the bottom plate 11 to define an accommodation groove 101 in the back frame 10. A side of at least partial ones of the connection plates 12 close to the accommodation groove 101 is provided with a sliding slot 110. A notch of the sliding slot 110 is provided facing the accommodation groove 101.

The optical diaphragm group 20 is disposed in the accommodation groove 101 and clamped into the sliding slot 110.

The display module is disposed on the back frame 10 and located on a side of the optical diaphragm group 20 away from the bottom plate 11. The back frame 10 also includes at least one fixation member 13 disposed on the connection plates 12. The optical diaphragm group 20 also includes at least one connection member 201 matching and connected to the at least one fixation member 13.

By designing the sliding slot 110 on a side surface of the connection plate 12 of the back frame 10, the optical diaphragm group 20 provided by the embodiment of the disclosure can be clamped into the sliding slot 110 during implementation and application processes. Specifically, by designing the fixation member 13 in the sliding slot 110 and the connection member 201 in the optical diaphragm group 20, the optical diaphragm group 20 can be fixed in the sliding slot 110 through a matching connection between the fixation member 13 and the connection member 201, so as to play a role in supporting and fixing the optical diaphragm group 20. In addition, the display module can be directly disposed on the back frame 10 without designing a middle frame, avoiding an undesirable phenomenon caused by friction between the middle frame and the back frame 10, and the optical diaphragm group 20, thereby improving a yield of the display device.

Specifically, please continue to refer to FIG. 2, and the display device provided by the embodiment of the disclosure includes the backlight module and the display module disposed on the light-emitting side of the backlight module. The backlight module includes the back frame 10 and various optical diaphragms disposed in the back frame 10, and the display module is disposed on the back frame 10. That is, the back frame 10 provided by the embodiment of the disclosure is also configured to support the display module on a basis of supporting each optical diaphragm.

Figure 3:
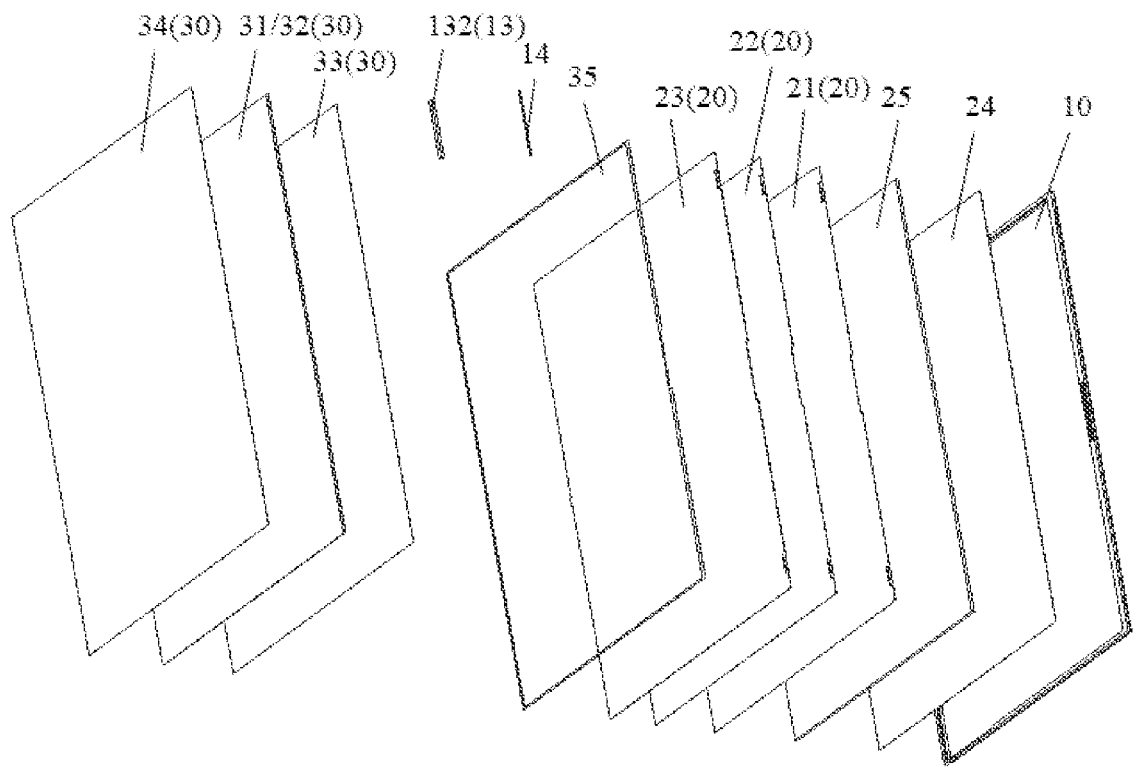
FIG. 3 is a schematic breakdown structural diagram of the display device provided by the embodiment of the disclosure.

Specifically, please refer to FIG. 2 and FIG. 3, the back frame 10 of the backlight module includes the bottom plate 11 and the plurality of connection plates 12 connected to the same side of the bottom plate 11, and the plurality of connection plates 12 surround the periphery of the bottom plate 11 to define the accommodation groove 101 in the back frame 10, as shown in FIG. 2. The optical diaphragms of the backlight module are disposed in the accommodation groove 101.

The optical diaphragms of the backlight module include a reflecting sheet 24 disposed on the bottom plate 11, a light guide plate 25 disposed on the reflecting sheet 24, and the optical diaphragm group 20 disposed on the light guide plate 25. The reflecting sheet 24 can be attached on the bottom plate 11 through an adhesive layer 26, and the light guide plate 25 and the reflecting sheet 24 can also be bonded through the adhesive layer 26.

The optical diaphragm group 20 includes a first optical diaphragm 21, a second optical diaphragm 22, and a third optical diaphragm 23 stacked in sequence. Optionally, the first optical diaphragm 21, the second optical diaphragm 22, and the third optical diaphragm 23 may be independently selected from one of a quantum dot film, a brightness enhancement film, and a prism diaphragm. Moreover, the embodiment of the disclosure does not limit types and quantities of optical diaphragms of the optical diaphragm group 20, and can be selected according to actual requirements.

In the embodiment of the disclosure, the side of the at least partial ones of the connection plates 12 close to the accommodation groove 101 is provided with the sliding slot 110, and the optical diaphragm group 20 is clamped into the sliding slot 110. That is, the optical diaphragm group 20 provided by the embodiment of the disclosure can be fixed and supported by designing the sliding slot 110 in the connection plates 12. Compared with an attachment method of using adhesive layers in the related art, by designing a mechanical structure to fix and support the optical diaphragm group 20 in the embodiment of the disclosure, reliability, stability and a yield of fixation of the optical diaphragm group 20 can be improved.

Further, the connection plate 12 is also provided with the fixation member 13, and the optical diaphragm group 20 is also provided with the connection member 201, further fixation of the back frame 10 and the optical diaphragm group 20 can be achieved through a matching connection between the connection member 201 and the fixation member 13, thereby improving the stability and the yield of the fixation of the optical diaphragm group 20.

Referring to FIG. 2, FIG. 4, FIG. 8, and FIG. 11, the plurality of connection plates 12 provided by an embodiment include a first connection plate 121, two second connection plates 122, and a third connection plate 123, and the first connection plate 121, the second connection plates 122, and the third connection plate 123 are connected to surround the accommodation groove 101.

Specifically, the two second connection plates 122 are connected between the first connection plate 121 and the third connection plate 123. An end of each second connection plate 122 is connected to an end of the first connection plate 121, and another end of each second connection plate 122 is connected to an end of the third connection plate 123.

Figure 4:
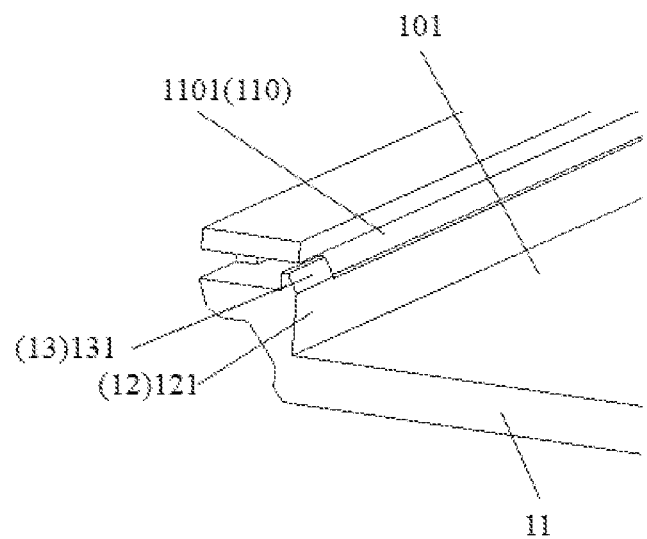
FIG. 4 is a schematic structural diagram of a protrusion part of a first connection plate provided by the embodiment of the disclosure.
Figure 5:
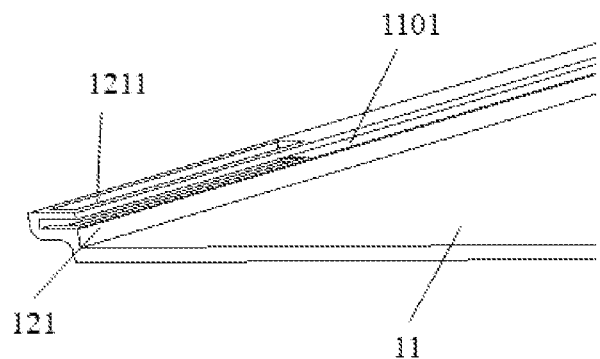
FIG. 5 is a schematic structural diagram of an assembly hole of the first connection plate provided by the embodiment of the disclosure.
Figure 12:
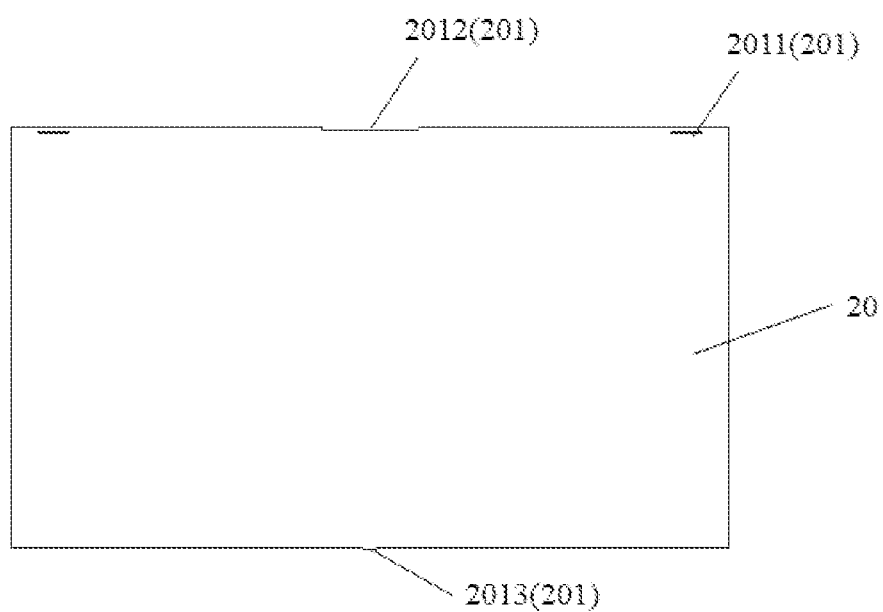
FIG. 12 is a schematic structural diagram of an optical diaphragm group provided by the embodiment of the disclosure.

Referring to FIG. 2, FIG. 4, and FIG. 12, the sliding slot 110 includes a first sliding slot 1101 provided in the first connection plate 121. A side of the optical diaphragm group 20 close to the first connection plate 121 is clamped into the first sliding slot 1101. A notch of the first sliding slot 1101 is provided facing the accommodation groove 101, and an extension direction of the first sliding slot 1101 can be parallel to the bottom plate 11.

The fixation member 13 of the back frame 10 includes a protrusion part 131 provided in the first sliding slot 1101. The connection member 201 is provided with an opening 2011 disposed corresponding to the protrusion part 131. After the optical diaphragm group 20 is assembled with the back frame 10, the protrusion part 131 can be inserted into the opening 2011.

A height of the protrusion part 131 may be less than, equal to, or greater than a depth of the opening 2011. The opening 2011 passes through the first optical diaphragm 21, the second optical diaphragm 22, and at least a part of the third optical diaphragm 23. The height of the protrusion part 131 is less than a length of the first sliding slot 1101 in a direction perpendicular to the bottom plate 11, so that the optical diaphragm group 20 can smoothly slide into the first sliding slot 1101.

It should be noted that a side of the protrusion part 131 close to the accommodation groove 101 is provided with an inclined surface, and a width of a side of the protrusion part 131 away from the bottom plate 11 is less than a width of a side of the protrusion part 131 close to the bottom plate 11. Therefore, when the optical diaphragm group 20 slides from outside of the first sliding slot 1101 into the first sliding slot 1101, the optical diaphragm group 20 can smoothly slide into the first sliding slot 1101 along the inclined surface of the protrusion part 131 to avoid the optical diaphragm group 20 being stuck. The above-mentioned inclined surface may be a circular arc surface, which is not limited here.

In the embodiment of the disclosure, the protrusion part 131 protrudes from the first sliding slot 110 in the direction perpendicular to the bottom plate 11. Therefore, when the opening 2011 in the optical diaphragm group 20 is sleeved on the protrusion part 131, it can prevent the optical diaphragm group 20 from moving in a direction parallel to the bottom plate 11, which can improve a fixation effect on the optical diaphragm group 20.

In an embodiment, a number of protrusion parts 131 is plural, and a plurality of protrusion parts are distributed in the first sliding slot 1101 along the extension direction of the first sliding slot 1101. The plurality of protrusion parts 131 are symmetrically disposed relative to a center of the first sliding slot 1101. A number of openings 2011 and the number of protrusion parts 131 are same, and the plurality of protrusion parts 131 are correspondingly connected to a plurality of openings 2011 one-to-one. For example, when the number of protrusion parts 131 is two, the two protrusion parts 131 are respectively located on opposite two sides of the first sliding slot 1101, so as to improve symmetry of the back frame 10 in fixing the optical diaphragm group 20.

In addition, in the embodiment of the disclosure, holes may be excavated on a back side of the first connection plate 121 corresponding to the protrusion part 131, and communicated with outside, so as to facilitate processing and molding of the protrusion part 131 during a manufacturing process of the back frame 10.

Further, please refer to FIG. 2, FIG. 3, FIG. 5, FIG. 6, FIG. 7, and FIG. 12, a middle part of the first connection plate 121 is provided with an assembly hole 1211 communicating with the first sliding slot 1101, and the fixation member 13 includes a limiting part 132 disposed in the first sliding slot 1101 and corresponding to the assembly hole 1211. Correspondingly, the connection member 201 is provided with an avoidance groove 2012 corresponding to the limiting part 132.

After the optical diaphragm group 20 slides into the first sliding slot 1101, the limiting part 132 is abutted against the optical diaphragm group 20 in the avoidance groove 2012, and specifically abutted against three groove surfaces defined inside the avoidance groove 2012 of the optical diaphragm group 20, thereby further preventing the optical diaphragm group 20 from moving in the direction parallel to the bottom plate 11.

It should be noted that the limiting part 132 may be a silica gel block. After the optical diaphragm group 20 slides into the first sliding slot 1101, the limiting part 132 is placed into the first sliding slot 1101 through the assembly hole 1211 to fix the optical diaphragm group 20.

In an embodiment, a shape of the assembly hole 1211 can be rectangular with a length of 40 mm and a width of 20 mm. A shape of the limiting part 132 may be rectangular with a size being less than a size of the assembly hole 1211. The assembly hole 1211 can expose the limiting part 132, and a surface of a side of the limiting part 132 away from the bottom plate 11 does not protrude outside the assembly hole 1211, so as to maintain a surface of the first connection plate 121 away from the bottom plate 11 as a plane to improve a yield of subsequent assembly.

Optionally, a distance between a surface of a side of the limiting part 132 away from the bottom plate 11 and a surface of a side of the first connection plate 121 away from the bottom plate 11 is greater than or equal to 0.5 mm.

Correspondingly, a length of the avoidance groove 2012 may be equal to or greater than 30 mm, and a width of the avoidance groove 2012 may be equal to or greater than 2 mm. A size of the avoidance groove 2012 can match the size of the limiting part 132, especially lengths of the two. For example, the length of the avoidance groove 2012 may be slightly greater than the length of the limiting part 132, so that the limiting part 132 can be inserted into the avoidance groove 2012. The larger the width of the avoidance groove 2012, the stronger a limiting effect of the limiting part 132 on the optical diaphragm group 20.

In addition, the backlight module also includes a first buffer member 14, and the first buffer member 14 is disposed on a side of the optical diaphragm group 20 away from the bottom plate 11 and close to the avoidance groove 2012, and located between the optical diaphragm group 20 and an inner wall of the first sliding slot 1101. That is, the first buffer member 14 can be attached to a surface of a side of the third optical diaphragm 23 away from the second optical diaphragm 22 and disposed close to the avoidance groove 2012, so as to avoid damage to the optical diaphragms of the optical diaphragm group 20 caused by collision or extrusion between the optical diaphragm group 20 and the first sliding slot 1101, and reduce generation of abnormal noises.

It should be noted that when the optical diaphragm group 20 is clamped into the first sliding slot 1101, a distance between the first buffer member 14 and an inner wall of a side of the first sliding slot 1101 away from the bottom plate 11 is greater than or equal to 0.05 mm, so that the optical diaphragm group 20 can smoothly slide into the first sliding slot 1101.

In the embodiment of the disclosure, a material of the first buffer member 14 may be foams, and a side surface of a side of the first buffer member 14 close to the accommodation groove 101 does not extend outside the first sliding slot 110, so as to avoid an impact of the first buffer member 14 on light output of the backlight module.

Please refer to FIG. 2, FIG. 3, FIG. 8, FIG. 9, FIG. 10, and FIG. 12, the two second connection plates 122 are connected to opposite two ends of the first connection plate 121, respectively. The sliding slot 110 includes a second sliding slot 1102 provided in each second connection plate 122, and two second sliding slots 1102 are connected to opposite two ends of the first sliding slot 1101, respectively. An extension direction of the second sliding slot 1102 is parallel to the bottom plate 11.

In the embodiment of the disclosure, a side of the second connection plate 122 away from the bottom plate 11 is provided with an assembly opening 1221 communicating with the second sliding slot 1102, the assembly opening 1221 is provided on an end of the second connection plate 122 away from the first connection plate 121, and located on a side of the second connection plate 122 close to the accommodation groove 101.

It can be understood that the assembly opening 1221 can expose the second sliding slot 1102 from a side of the second connection plate 122 away from the bottom plate 11. Therefore, after the reflecting sheet 24 and the light guide plate 25 are assembled into the accommodation groove 101, the optical diaphragm group 20 can slide into the second sliding slot 1102 from the assembly opening 1221 and be pushed into the second sliding slot 1102 in a direction towards the first connection plate 121, until the opening 2011 and the avoidance groove 2012 in the optical diaphragm group 20 match and are connected to the protrusion part 131 and the limiting part 132, respectively. That is, a design of the assembly opening 1221 on a side of the second connection plate 122 away from the first connection plate 121 can facilitate smooth sliding of the optical diaphragm group 20 into the sliding slot 110.

A boundary of a side of the assembly opening 1221 away from the accommodation groove 101 does not overlap the optical diaphragm group 20 in a thickness direction of the optical diaphragm group 20. That is, when the optical diaphragm group 20 is placed into the second sliding slot 1102 from the assembly opening 1221, a side surface of the assembly opening 1221 does not form a barrier to the optical diaphragm group 20. Optionally, after the optical diaphragm group 20 slides into the second sliding slot 1102, a distance between the boundary of the side of the assembly opening 1221 away from the accommodation groove 101 and the optical diaphragm group 20 is greater than or equal to 0.1 mm, and a length of the assembly opening 1221 is greater than or equal to one-third of a length of the second sliding slot 1102 along the extension direction of the second sliding slot 1102, so that the optical diaphragm group 20 can more easily slide into the second sliding slot 1102.

It should be noted that a length of the second connection plate 122 is less than a length of the first connection plate 121 in a direction surrounding the accommodation groove 101. Correspondingly, a length of a side surface of the optical diaphragm group 20 fixedly connected to the first connection plate 121 is greater than a length of a side surface of the optical diaphragm group 20 fixedly connected to the second connection plate 122, thereby allowing the side surface of the optical diaphragm group 20 with a greater length to be fixedly connected to the protrusion part 131 and the limiting part 132 to improve a fixation effect of the optical diaphragm group 20, and making the side surface of the optical diaphragm group 20 with a less length a side surface that slides in the second sliding slot 1102, so as to reduce a sliding distance of the optical diaphragm group 20, thereby reducing probability of damage during a sliding process of the optical diaphragm group 20.

Referring to FIG. 2, FIG. 3, FIG. 11, and FIG. 12, and the third connection plate 123 is connected between the two second connection plates 122. The fixation member 13 is provided with a fixation groove 133 defined on the third connection plate 123. The connection member 201 also includes an outer convex structure 2013 disposed corresponding to the fixation groove 133 of the optical diaphragm group 20. Therefore, when the optical diaphragm group 20 is clamped into the sliding slot 110, the outer convex structure 2013 is inserted into the fixation groove 133 to fix and support a side of the optical diaphragm group 20 away from the first connection plate 121, and at a same time, it can prevent movement of the optical diaphragm group 20 in the direction parallel to the bottom plate 11 and in the direction perpendicular to the bottom plate 11.

Optionally, a length of the outer convex structure 2013 may be greater than or equal to 8 mm, and a width of the outer convex structure 2013 may be greater than or equal to 1.5 mm. Correspondingly, a size of the fixation groove 133 may be slightly greater than a size of the outer convex structure 2013, so that the outer convex structure 2013 of the optical diaphragm group 20 can be smoothly inserted into the fixation groove 133.

To sum up, during an assembly process of the backlight module, a light source, the reflecting sheet 24, and the light guide plate 25 can be assembled into the back frame 10 first, the first optical diaphragm 21, the second optical diaphragm 22, and the third optical diaphragm 23 are stacked, and the first buffer member 14 is attached on a surface of the third optical diaphragm 23 away from the second optical diaphragm 22, and at a position of the third optical diaphragm 23 close to the avoidance groove 2012. A side of the optical diaphragm group 20 attached to the first buffer member 14 slides into the assembly opening 1221 in a direction towards the first connection plate 121, and then slides into the second sliding slot 1102 along the assembly opening 1221. Then, the optical diaphragm group 20 slides into the first sliding slot 1101 from the second sliding slot 1102 and slides through the inclined surface of the protrusion part 131, so that the opening 2011 of the optical diaphragm group 20 is sleeved on the protrusion part 131. At this time, the avoidance groove 2012 of the optical diaphragm group 20 enters the first sliding slot 1101, and the first buffer member 14 is located between the optical diaphragm group 20 and the inner wall of the first sliding slot 1101. Then, the limiting part 132 is placed into the first sliding slot 1101 through the assembly hole 1211, and abutted against the optical diaphragm group 20 in the avoidance groove 2012. Finally, the outer convex structure 2013 of the optical diaphragm group 20 is clamped into the fixation groove 133 of the third connection plate 123, so as to achieve assembly and fixation of the optical diaphragm group 20.

It should be noted that the light source in the backlight module provided by the embodiment of the disclosure may include a light source including mini light-emitting diodes (mini-LEDs) or a light source including micro light-emitting diodes (Micro-LEDs), and a type of the light source may be a straight down type or an edge-lit type, which is not limited herein.

Please refer to FIG. 2 and FIG. 3, in the embodiment of the disclosure, the display module is disposed on the back frame 10, that is, the display module is disposed on a surface of a side of the connection plate 12 away from the bottom plate 11. Specifically, the display panel 30 includes a second buffer member 35 and a display panel 30.

Optionally, the second buffer member 35 may be foams.

The second buffer member 35 is disposed on a surface of a side of the first connection plate 121 away from the bottom plate 11, a surface of a side of the second connection plate 122 away from the bottom plate 11, and a surface of a side of the third connection plate 123 away from the bottom plate 11. The display panel 30 is disposed on a surface of a side of the second buffer member 35 away from the back frame 10.

Figure 6:
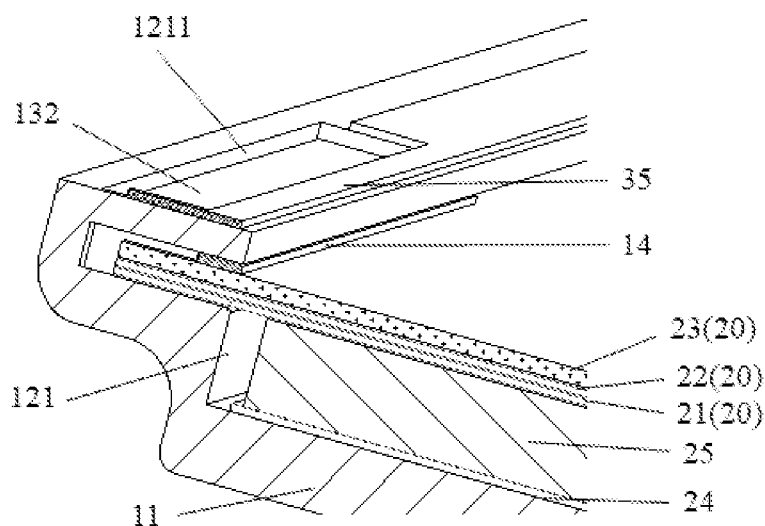
FIG. 6 is a schematic structural diagram of a backlight module provided by the embodiment of the disclosure at a position the assembly hole located.
Figure 7:
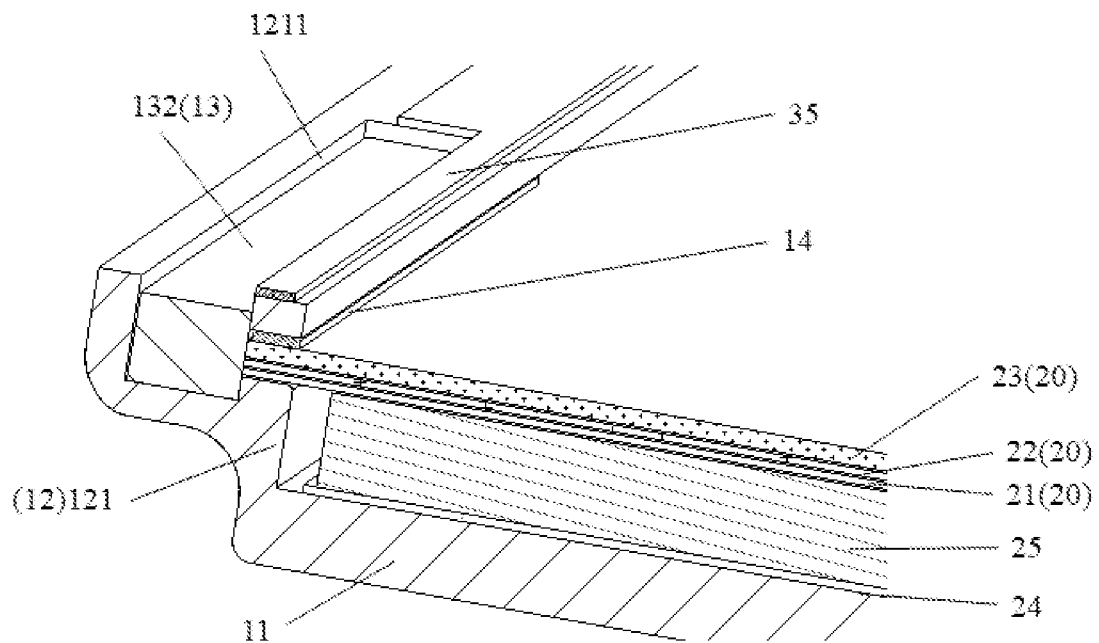
FIG. 7 is another schematic structural diagram of the backlight module provided by the embodiment of the disclosure at the position the assembly hole located.
Figure 8:
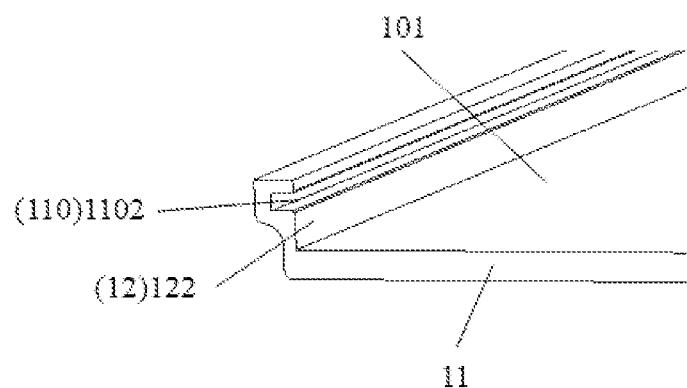
FIG. 8 is a schematic structural diagram of a second connection plate provided by the embodiment of the disclosure.
Figure 9:
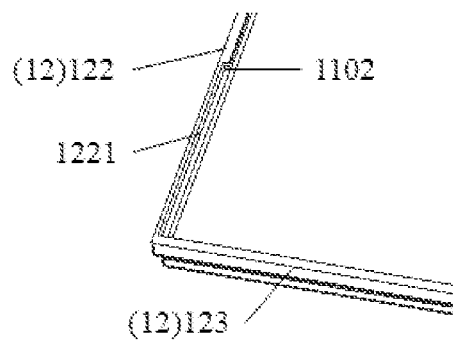
FIG. 9 is a schematic structural diagram of an assembly opening of the second connection plate provided by the embodiment of the disclosure.
Figure 10:
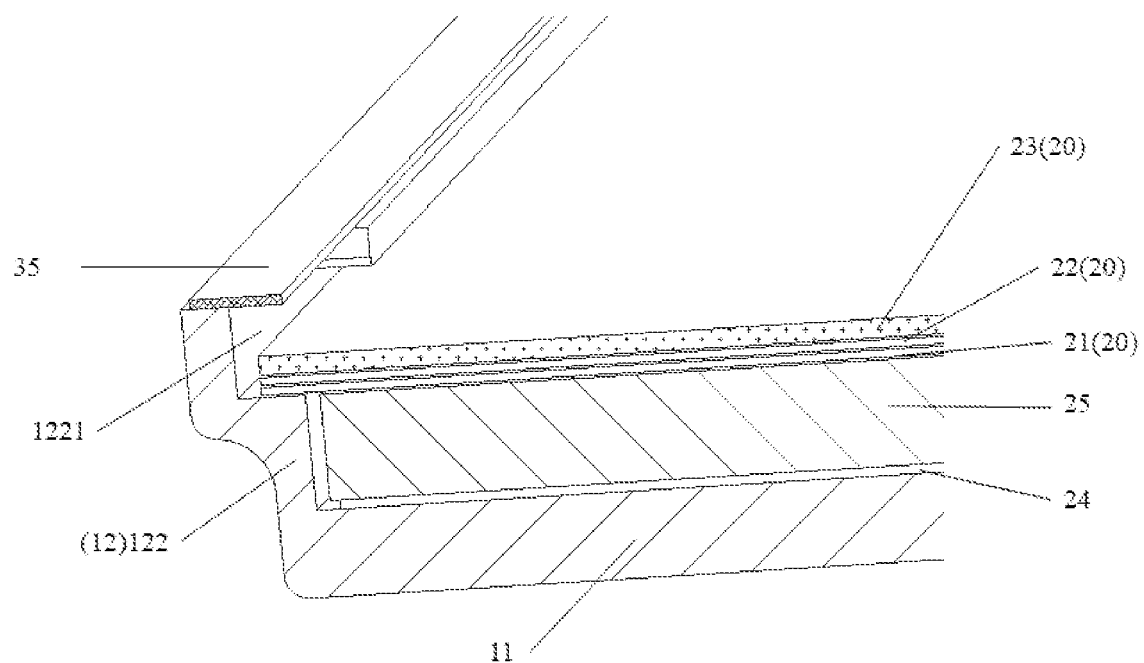
FIG. 10 is a schematic structural diagram of the backlight module provided by the embodiment of the disclosure at a position the assembly opening located.
Figure 11:
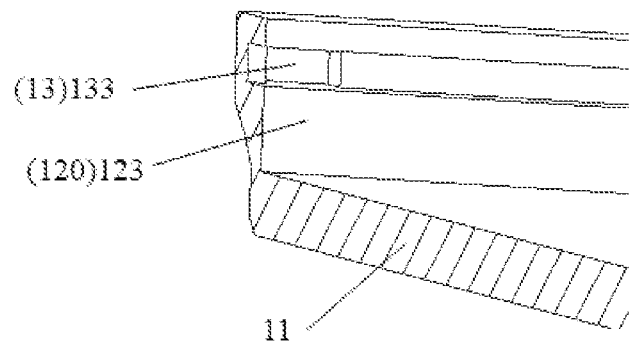
FIG. 11 is a schematic structural diagram of a third connection plate provided by the embodiment of the disclosure.

Further, referring to FIG. 6 and FIG. 7, and the second buffer 35 is disposed away from the assembly hole 1211 to avoid any impact and inconvenience on subsequent adjustment of the limiting part 132. Referring to FIG. 10, the second buffer member 35 also extends onto a side of the assembly opening 1221 away from the bottom plate 11 to shield the assembly opening 1221, which can avoid collision or compression between the display panel 30 and the optical diaphragm group 20 at a position the assembly opening 1221 located.

It should be noted that the assembly opening 1221 is located on a side of the second connection plate 122 close to the accommodation groove 101, a side of the second buffer member 35 disposed corresponding to the assembly opening 1221 away from the accommodation groove 101 can be attached to a surface of the second connection plate 122 away from the bottom plate 11, and a side of the second buffer member 35 disposed corresponding to the assembly opening 1221 close to the accommodation groove 101 can cover a side of the assembly opening 1221 away from the bottom plate 11. A width of the second buffer member 35 attached to a surface of the second connection plate 122 away from the bottom plate 11 is greater than or equal to 0.8 mm, so as to ensure stability of the second buffer member 35 at the position the assembly opening 1221 located.

The display panel 30 is disposed on a surface of a side of the second buffer member 35 away from the back frame 10. The display panel 30 includes a lower polarizer 33 located on a side of the optical diaphragm group 20 away from the bottom plate 11, an array substrate 31 located on a side of the lower polarizer 33 away from the optical diaphragm group 20, a color film substrate 32 located on a side of the array substrate 31 away from the lower polarizer 33, and an upper polarizer 34 located on a side of the color film substrate 32 away from the array substrate 31.

It can be understood that the display module can be directly disposed on the back frame 10 in the embodiment of the disclosure, thereby eliminating a design of a middle frame.

To sum up, by designing the sliding slot 110 on the side surface of the connection plate 12 of the back frame 10, the optical diaphragm group 20 provided by the embodiment of the disclosure can be clamped into the sliding slot 110. Specifically, by designing the fixation member 13 in the sliding slot 110 and the connection member 201 in the optical diaphragm group 20, the optical diaphragm group 20 can be fixed in the sliding slot 110 through a matching connection between the fixation member 13 and the connection member 201, so as to play a role in supporting and fixing the optical diaphragm group 20. In addition, the display module can be directly disposed on the back frame 10 without designing a middle frame, avoiding an undesirable phenomenon caused by friction between the middle frame and the back frame 10, and the optical diaphragm group 20, thereby improving the yield of the display device.

In the above-mentioned embodiments, description of each embodiment has its own emphasis. For parts not detailed in an embodiment, please refer to relevant descriptions of other embodiments.

The display device provided by the embodiments of the present disclosure are described in detail. In this paper, specific embodiments are adopted to illustrate a principle and implementation modes of the present disclosure. The description of the above-mentioned embodiments is only used to help understand methods and a core idea of the present disclosure. At the same time, for those skilled in the art, of the idea of the present disclosure, there will be changes in specific implementation modes and a scope of the present disclosure. In conclusion, contents of the specification should not be interpreted as a limitation of the present disclosure.

What is claimed is:

1. A display device, comprising a backlight module and a display module located on a light-emitting side of the backlight module;

wherein the backlight module comprises:
a back frame, comprising a bottom plate and a plurality of connection plates connected to a same side of the bottom plate, wherein the plurality of connection plates surround periphery of the bottom plate to define an accommodation groove in the back frame, a side of at least partial ones of the connection plates close to the accommodation groove is provided with a sliding slot, and a notch of the sliding slot is provided facing the accommodation groove; and
an optical diaphragm group, disposed in the accommodation groove and clamped into the sliding slot;
wherein the display module is disposed on the back frame and located on a side of the optical diaphragm group away from the bottom plate, the back frame further comprises at least one fixation member disposed on the connection plates, and the optical diaphragm group further comprises at least one connection member matching and connected to the at least one fixation member;
wherein the plurality of connection plates comprise a first connection plate, and the sliding slot comprises a first sliding slot provided on a side of the first connection plate close to the accommodation groove; and the fixation member comprises a protrusion part disposed in the first sliding slot, the connection member is provided with an opening corresponding to the protrusion part, and the protrusion part is inserted into the opening; and
wherein the protrusion part comprises an inclined surface facing the accommodation groove, and the inclined surface of the protrusion part is inclined towards the display module.

2. The display device of claim 1, wherein the fixation member comprises a plurality of protrusion parts that are distributed in the first sliding slot along an extension direction of the first sliding slot and symmetrically disposed relative to a center of the first sliding slot; the connection member is provided with a plurality of openings, a number of the openings and a number of the protrusion parts are same, and the plurality of protrusion parts are correspondingly connected to the plurality of openings one-to-one.

3. The display device of claim 1, wherein a width of a side of the protrusion part away from the bottom plate is less than a width of a side of the protrusion part close to the bottom plate.

4. The display device of claim 1, wherein the fixation member further comprises a limiting part disposed in the first sliding slot, the connection member is further provided with an avoidance groove corresponding to the limiting part, and the limiting part is abutted against the optical diaphragm group in the avoidance groove.

5. The display device of claim 4, wherein the first connection plate is provided with an assembly hole corresponding to the limiting part, and the assembly hole is communicated with the first sliding slot to expose the limiting part.

6. The display device of claim 5, wherein a surface of a side of the limiting part close to the assembly hole does not protrude outside the assembly hole.

7. The display device of claim 6, wherein the backlight module further comprises a first buffer member, and the first buffer member is disposed on a side of the optical diaphragm group away from the bottom plate and close to the avoidance groove, and disposed between the optical diaphragm group and an inner wall of the first sliding slot.

8. The display device of claim 1, wherein the plurality of connection plates further comprises two second connection plates connected to opposite two ends of the first connection plate, respectively, and the sliding slot further comprises a second sliding slot provided on each of the second connection plates and communicated with the first sliding slot.

9. The display device of claim 8, wherein the plurality of connection plates further comprises a third connection plate disposed opposite to the first connection plate, the two second connection plates are further connected to opposite two ends of the third connection plate, respectively, and the first connection plate, the two second connection plates, and the third connection plate are connected to define the accommodation groove.

10. The display device of claim 9, wherein the fixation member is further provided with a fixation groove defined on the third connection plate, the connection member further comprises an outer convex structure corresponding to the fixation groove, and the outer convex structure is inserted into the fixation groove.

11. The display device of claim 9, wherein a side of each of the second connection plates away from the bottom plate is provided with an assembly opening communicating with the second sliding slot, and the assembly opening is defined on an end of the second connection plates away from the first connection plate, and located on a side of the second connection plates close to the accommodation groove; and wherein the display module comprises a second buffer member and a display panel, the second buffer member is disposed on a surface of a side of the first connection plate away from the bottom plate, a surface of a side of the second connection plates away from the bottom plate, and a surface of a side of the third connection plate away from the bottom plate, and the display panel is disposed on a surface of a side of the second buffer member away from the back frame.

12. The display device of claim 11, wherein the second buffer member further extends onto a side of the assembly opening away from the bottom plate.

13. The display device of claim 12, wherein a boundary of a side of the assembly opening away from the accommodation groove does not overlap the optical diaphragm group in a thickness direction of the optical diaphragm group.

14. The display device of claim 1, wherein the protrusion part further comprises a first side surface, a second side surface, and a flat surface, the first side surface, the flat surface, the inclined surface, and the second side surface are sequentially connected; both of the first side surface and the second side surface are in contact with a sidewall of the opening, the flat surface is a surface of the protrusion part facing the display module, and a width of the flat surface is less than a width of a surface of the protrusion part away from the display module.

15. The display device of claim 1, wherein the optical diaphragm group comprises a first optical diaphragm, a second optical diaphragm, and a third optical diaphragm stacked in sequence, and the opening passes through the first optical diaphragm, the second optical diaphragm, and at least a part of the third optical diaphragm.

16. A display device, comprising a backlight module and a display module located on a light-emitting side of the backlight module;
wherein the backlight module comprises:
a back frame, comprising a bottom plate and a plurality of connection plates connected to a same side of the bottom plate, wherein the plurality of connection plates surround periphery of the bottom plate to define an accommodation groove in the back frame, a side of at least partial ones of the connection plates close to the accommodation groove is provided with a sliding slot, and a notch of the sliding slot is provided facing the accommodation groove; and
an optical diaphragm group, disposed in the accommodation groove and clamped into the sliding slot;
wherein the display module is disposed on the back frame and located on a side of the optical diaphragm group away from the bottom plate, the back frame further comprises at least one fixation member disposed on the connection plates, and the optical diaphragm group further comprises at least one connection member matching and connected to the at least one fixation member;
wherein the plurality of connection plates comprise a first connection plate, and the sliding slot comprises a first sliding slot provided on a side of the first connection plate close to the accommodation groove; wherein the fixation member comprises a protrusion part disposed in the first sliding slot, the connection member is provided with an opening corresponding to the protrusion part, and the protrusion part is inserted into the opening; and
wherein the fixation member further comprises a limiting part disposed in the first sliding slot, the connection member is further provided with an avoidance groove corresponding to the limiting part, and the limiting part is abutted against the optical diaphragm group in the avoidance groove.

17. The display device of claim 16, wherein the fixation member comprises a plurality of protrusion parts that are distributed in the first sliding slot along an extension direction of the first sliding slot and symmetrically disposed relative to a center of the first sliding slot; the connection member is provided with a plurality of openings, a number of the openings and a number of the protrusion parts are same, and the plurality of protrusion parts are correspondingly connected to the plurality of openings one-to-one.

18. The display device of claim 16, wherein the plurality of connection plates further comprises two second connection plates connected to opposite two ends of the first connection plate, respectively, and the sliding slot further comprises a second sliding slot provided on each of the second connection plates and communicated with the first sliding slot.

19. The display device of claim 18, wherein the plurality of connection plates further comprises a third connection plate disposed opposite to the first connection plate, the two second connection plates are further connected to opposite two ends of the third connection plate, respectively, and the first connection plate, the two second connection plates, and the third connection plate are connected to define the accommodation groove.

20. The display device of claim 19, wherein a side of each of the second connection plates away from the bottom plate is provided with an assembly opening communicating with the second sliding slot, and the assembly opening is defined on an end of the second connection plates away from the first connection plate, and located on a side of the second connection plates close to the accommodation groove; and
wherein the display module comprises a second buffer member and a display panel, the second buffer member is disposed on a surface of a side of the first connection plate away from the bottom plate, a surface of a side of the second connection plates away from the bottom plate, and a surface of a side of the third connection plate away from the bottom plate, and the display panel is disposed on a surface of a side of the second buffer member away from the back frame.

* * * * *